United States Patent
Ito et al.

(10) Patent No.: US 6,454,830 B1
(45) Date of Patent: Sep. 24, 2002

(54) NICKEL POWDER FOR MULTILAYER CERAMIC CAPACITORS

(75) Inventors: Takayuki Ito, Chigasaki (JP); Hideo Takatori, Chigasaki (JP)

(73) Assignees: Toho Titanium Co., Ltd., Chigasaki (JP); Toho Titanium, Chigasaki (JP)

( * ) Notice: Subject to any disclaimer, the term of this patent is extended or adjusted under 35 U.S.C. 154(b) by 88 days.

(21) Appl. No.: 09/786,032

(22) PCT Filed: Aug. 24, 2000

(86) PCT No.: PCT/JP00/05688
§ 371 (c)(1),
(2), (4) Date: Apr. 9, 2001

(87) PCT Pub. No.: WO01/15838
PCT Pub. Date: Mar. 8, 2001

(30) Foreign Application Priority Data

Aug. 31, 1999 (JP) ............................................. 11-244895
Aug. 31, 1999 (JP) ............................................. 11-244896

(51) Int. Cl.[7] ................................................. B22F 1/00
(52) U.S. Cl. ......................................................... 75/255
(58) Field of Search .................................... 75/255, 367

(56) References Cited

U.S. PATENT DOCUMENTS

| | | | | |
|---|---|---|---|---|
| 3,748,118 A | * | 7/1973 | Montino et al. | |
| 3,850,612 A | * | 11/1974 | Montino et al. | |
| 5,853,451 A | * | 12/1998 | Ishikawa | 75/367 |
| 6,120,576 A | * | 9/2000 | Toshima et al. | 75/370 |
| 6,168,752 B1 | * | 1/2001 | Kagohashi et al. | 266/171 |
| 6,235,077 B1 | * | 5/2001 | Kagohashi et al. | 75/369 |
| 6,312,496 B1 | * | 11/2001 | Katayama et al. | 75/255 |
| 6,316,100 B1 | * | 11/2001 | Kodas et al. | 428/357 |

FOREIGN PATENT DOCUMENTS

| | | | |
|---|---|---|---|
| JP | A 62-74005 | * | 4/1987 |
| JP | A 3-280304 | * | 12/1991 |
| JP | A 8-157813 | * | 6/1996 |
| JP | A 8-246001 | * | 9/1996 |
| JP | A 10-211615 | * | 8/1998 |
| JP | 11-080817 | | 3/1999 |
| JP | A 11-152507 | * | 6/1999 |
| JP | 11-189801 | | 7/1999 |

* cited by examiner

*Primary Examiner*—Ngoclan Mai
(74) *Attorney, Agent, or Firm*—Oliff & Berridge, PLC

(57) ABSTRACT

A nickel powder for multilayer ceramic capacitors according to the present invention is characterized in that an average particle size of a nickel powder is 0.1 to 1.0 $\mu$m, and the number rate of a nickel powder having a particle size of 2 $\mu$m or more is not more than 700 per million. As a process for producing such nickel powder, a process in which slurry containing a nickel powder having an average particle size of 0.1 to 1.0 $\mu$m in the amount of 5 to 25% by weight is classified using a hydrocyclone in which powders in a powder-liquid mixture are classified into at least coarse particles and fine particles, is preferred. According to the nickel powder of the present invention, the content of coarse particles is low, the particle size distribution is narrow, and the surface roughness in the paste state is decreased, and therefore, the nickel powder is extremely suitable for multilayer ceramic capacitors.

10 Claims, 1 Drawing Sheet

NICKEL POWDER FOR MULTILAYER CERAMIC CAPACITORS

TECHNICAL FIELD

The present invention relates to a nickel powder for multilayer ceramic capacitors suitable as a material of conductive paste fillers for forming internal electrodes in multilayer ceramic capacitors.

BACKGROUND ART

Conductive metal powders such as nickel, copper, silver, etc., are useful for forming internal electrodes in multilayer ceramic capacitors, and in particular, nickel powder has attracted attention since it is less expensive than conventional metal powders such as palladium powder, etc. Additionally, internal electrodes tend to be formed in thin layers having a thickness of 1 to 2 $\mu$m in accordance with miniaturization and capacity increase of capacitors, and therefore, it is required that nickel powder have a particle size of not more than 1 $\mu$m.

As nickel powder which satisfies such properties, fine spherical nickel powder having a purity of 99.5% or more by weight and a particle size of 0.05 to 1.0 $\mu$m is disclosed in Japanese Unexamined Patent Publication No. Hei 3-280304. According to this nickel powder, since filling density in the electrode layer can be increased, specific resistance of the electrode layer after sintering is small and delamination (peeling) and cracking hardly occur.

In addition, as a process for production of nickel powder, a vapor phase reduction in which nickel chloride gas is reduced by hydrogen gas is generally used, recently. This method has an advantage in that spherical nickel powders can be efficiently produced; however, nickel powders having a particle size of 1 $\mu$m or more are often included in the produced nickel powders. The nickel powder having a particle size of 1 $\mu$m or more easily causes problems such as shorting between electrodes or voids in the electrode layer, and it does not have desirable properties. Therefore, high-quality nickel powder having no coarse particles of 1 $\mu$m or more is desired. Since nickel powder particles of 1 to 2 $\mu$m or 5 $\mu$m, depending on the conditions, are included even if an average particle size thereof is 0.4 $\mu$m, a classification technique in which coarse particles of 1 $\mu$m or more can be efficiently removed is desired.

The present invention has been made in consideration of the above circumstances, and objects thereof are as follows.

① A nickel powder for multilayer ceramic capacitors is provided in which the content of coarse particles is low and the distribution of particle size is narrow.

② A nickel powder for multilayer ceramic capacitors is provided in which the surface roughness in the paste state is small.

DISCLOSURE OF INVENTION

The present inventors reduced nickel chloride by a vapor phase reduction, then prepared nickel powders in the paste state with respect to each nickel powder in which the contents of nickel powders having a particle size of 2 $\mu$m or more differ, and examined the surface roughness thereof. As a result, it was found that satisfactory surface roughness was not obtained in the case in which nickel powders having a particle size of 2 $\mu$m or more exist at a rate of about 1400 per million; however, superior surface roughness was obtained in the case in which the nickel powders exist at a rate of about 50 per million. It was inferred from this fact that the surface roughness in which there is no problem in practical use would be obtained if nickel powder were classified until nickel powders having a particle size of 2 $\mu$m or more exist at a rate of 700 per million, which is about the intermediate value between 50 per million and 1400 per million, and the present invention therefore was attained. That is, a nickel powder for multilayer ceramic capacitors according to the present invention is characterized in that an average particle size is 0.1 to 1.0 $\mu$m, and the nickel powders having a particle size of 2 $\mu$m or more exist at a rate of not more than 700 per million.

Next, the present invention is more specifically explained.

A. Nickel Powder Characteristics

The nickel powder of the present invention is characterized in that an average particle size is 0.1 to 1.0 $\mu$m, and the number rate of the nickel powders having a particle size of 2 $\mu$m or more is not more than 700 per million, as described above. When such nickel powder is used for the paste, the uniformity of thickness of the internal electrode layer in ceramic capacitors is superior, and shorting between internal electrodes is thereby improved. The content (number rate) of nickel powder having a particle size of 2 $\mu$m or more can be obtained by taking and image-analyzing electron microphotographs of nickel powder, and counting the total number of particles and particles having a particle size of 2 $\mu$m or more.

The number rate of the nickel powders having a particle size of 2 $\mu$m or more must be not more than 700 per million, and it is preferable that the number rate is not more than 300 per million, more preferably that the number rate is not more than 100 per million, and most preferably that the number rate is not more than 50 per million.

It is preferable that the average particle size of the nickel powder be even smaller; however, the nickel powders easily aggregate as they are made finer, and consequently, voids are easily formed in internal electrodes. Therefore, as nickel powder for forming an internal electrode of about 1 $\mu$m, a particle having an average particle size of 0.2 to 0.4 $\mu$m is desirable.

With respect to this nickel powder particle having an average particle size of 0.2 to 0.4 $\mu$m, the content (number rate) of the nickel powders having a particle size of 2 $\mu$m or more is preferably not more than 50 per million, and more preferably that the number rate is not more than 20 per million. Furthermore, the number rate of the nickel powders having a particle size of 1 $\mu$m or more is preferably not more than 100 per million, and more preferably that the number rate is not more than 50 per million.

B. Preparation of Nickel Powder

The above nickel powder of the present invention can be prepared by various methods, and in particular, the vapor phase reduction in which nickel chloride is reduced by hydrogen, etc., is a preferable method from the viewpoint of control of particle size. Specifically, the following processes may be mentioned.

① Nickel chloride solid as a starting material is vaporized by heating and reacts with hydrogen gas (reduction process), and nickel powder is therefore obtained.

② Nickel solid as a starting material is chlorinated by contacting chlorine gas (chlorination process), nickel chloride gas is thereby produced and reacts with hydrogen gas (reduction process), and nickel powder is therefore obtained.

In the process ② of the above processes, the partial pressure of nickel chloride gas can be controlled in the reduction process by controlling the feed rate of chlorine gas in the chlorination process or by mixing nickel chloride gas produced in the chlorination process with inert gas. Thus, by controlling the partial pressure of nickel chloride gas, the particle size of forming nickel powder can be controlled, and as a result, the particle size of nickel powder can be stabilized and can be optionally controlled.

Incidentally, the reduction process in the above vapor phase reduction is carried out at a high temperature of about 1000° C. or more. The nickel powder just after production is easily aggregated since it has a high temperature, and it is therefore desirable that it cool rapidly. Specifically, a process in which the produced nickel powder is forced to cool by inert gas such as nitrogen gas, etc., may be mentioned. As a cooling process, a cooling device, etc., can be provided and be used in addition to the reduction reaction system, and in particular, it is desirable that inert gas for cooling be directly contacted with nickel powder just after production from the viewpoint of suppression of the aggregation of nickel powder. In such a cooling process, the cooling rate in which the nickel powder just after production is forced to cool is preferably 30° C./second or more, more preferably 40° C./second or more, and most preferably 50 to 200° C./second, and in addition, the temperature to which it is to be cooled, from a temperature level of the reduction reaction, is preferably at least not more than 800° C., more preferably not more than 600° C., and most preferably not more than 400° C. In addition, after such cooling, it is also preferable to further cool the nickel powder to a temperature which is lower than the above temperature (for example, a temperature ranging from room temperature to about 150° C.) at the same cooling rate.

Thus, a nickel powder of the present invention in which few coarse particles having a particle size of 2 μm or more are included can be obtained by controlling reaction conditions and cooling conditions for producing nickel powder.

In order to obtain the nickel powder of the present invention, it is preferable that the above produced nickel powder be further classified by mechanical means and that the coarse particles be removed. In the following, the specific classification process is explained.

C. Classification Process for Nickel Powder

As a process for classifying nickel powder having a particle size of 2 μm or more, that is, coarse particles, general classifiers such as hydrocyclones, air classifiers, etc., may be employed. However, since hydrogen chloride gas or nickel chloride is adhered or adsorbed at the surface of the produced nickel powder and must usually be removed by washing, a process in which the nickel powder is dispersed in water and is prepared in the slurry form and is then classified by removing coarse particles using a hydrocyclone, is desirable.

D. Hydrocyclone

As a hydrocyclone, a two-liquid separating type in which fine particles are discharged from the top portion of the apparatus and coarse particles are discharged from the bottom portion thereof, and a three-liquid separating type in which super-fine particles, which are finer than fine particles, are discharged from the top portion of the apparatus, fine particles are discharged from the middle portion thereof, and coarse particles are discharged from the bottom portion thereof, can be mentioned. Of these, the latter type is more preferably used from the viewpoint of the particle size being delicately controlled. The nickel powder discharged from the top portion and/or the middle portion is defined as a nickel powder of the present invention.

It is preferable that material for the hydrocyclone be ceramic in order to ensure corrosion resistance and wear resistance. As a ceramic, alumina or silicon nitride is desirable. The hydrocyclone may be operated alone or in combination which two or more hydrocyclones in parallel, and mass production can be realized by parallel operation of two or more hydrocyclones, and the productivity can thereby be effectively improved.

E. Slurry

As a medium when the nickel powder is prepared in the slurry form, water can be preferably used as described above. That is, the slurry is obtained by dispersing nickel powder having an average particle size of 0.1 to 1.0 μm into water and is fed into the hydrocyclone. The content of nickel powder in the slurry (slurry concentration) is preferably 5 to 25% by weight, more preferably 7 to 20% by weight, and most preferably 8 to 15% by weight.

In the case in which the above three-liquid separating type of hydrocyclone is used, it is not desirable that the slurry concentration of nickel powder be less than 5% by weight since coarse particles would be easily included in the slurry discharged from the top portion and/or the middle portion. Furthermore, as the slurry concentration is increased, the content of coarse particles in the slurry discharged from the top portion and the middle portion is rapidly decreased; however, when it is more than 20% by weight, the classification efficiency decreases and many coarse particles are included in nickel powder. When the content of the nickel powder in the slurry is within the above range, in particular, in the case in which it is 7 to 20% by weight and is preferably 8 to 15% by weight, it is desirable because the manufacturing efficiency and the classification efficiency are remarkably superior. By classifying nickel powder under such conditions, a nickel powder in which the number rate of coarse particles having a particle size of 2 μm or more is not more than 50 particles per million particles and is extremely low, can be obtained.

F. Discharge Rate of Nickel Powder from Hydrocyclone

With respect to the discharge rate of nickel powder from the above hydrocyclone, a discharge rate in which 5 to 80% of nickel powder in slurry fed into the hydrocyclone is discharged from a nozzle for discharging fine particles of the hydrocyclone and the remainder is discharged from a nozzle for discharging coarse particles, is preferable. In this case, the hydrocyclone is a two-liquid separating type, and the nozzle for discharging fine particles means the above top portion and the nozzle for discharging coarse particles means the bottom portion.

As a more preferable discharge rate, the nickel powder discharged from the top portion (nozzle for discharging super fine particles) and/or the middle portion (nozzle for discharging fine particles) of the hydrocyclone, using the above three-liquid separating type of hydrocyclone, is preferably 5 to 80% by weight and more preferably 5 to 70% by weight. In this case, it is the most desirable that the nickel powder further discharged from the middle portion be 20 to 75% by weight. In the case in which coarse particles must be classified more precisely, it is desirable that the nickel powder discharged from the middle portion be prepared in the slurry form according to the present invention and be fed into the hydrocyclone.

Thus, the nickel powder in the slurry discharged from the top portion and/or the middle portion of the hydrocyclone is separated from water by decantation, filtration, etc., then some processes such as drying, etc., are carried out, and a nickel powder of the present invention is therefore obtained.

The nickel powder is added to organic solvent such as terpineol, decanol etc., and cellulose-type of organic resin such as ethyl cellulose, etc., and is mixed, plasticizers such as phthalic ester etc., are further added therein, and a conductive paste is thereby prepared, and in addition, an internal electrode in a multilayer ceramic capacitor is formed by the conductive paste. A nickel powder of the present invention can prevent failures such as shorting, delamination, etc., due to the roughness of the surface of the electrode, when it is used as an internal electrode in a multilayer ceramic capacitor, because coarse particles having a particle size of 2 μm or more are very rare.

BEST MODE FOR CARRYING OUT THE INVENTION

Figure 1:
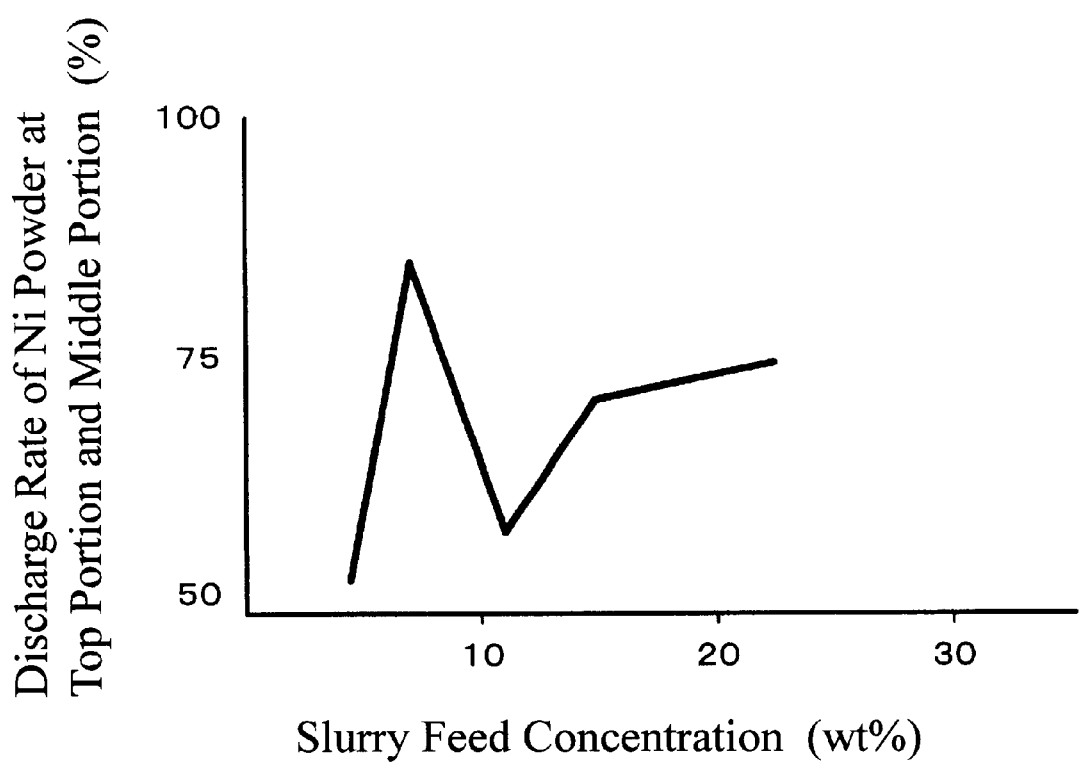
FIG. 1 is a chart showing a relationship between slurry concentration and discharge rate of nickel powder from "the top portion and the middle portion" according to an Example of the present invention.

In the following, effects of the present invention will be further clarified by explaining Examples of the present invention.

EXAMPLE 1

Classification Test of Nickel Powder

Two kinds of nickel powder (average particle sizes of 0.62 μm and 0.65 μm) were produced by a vapor phase reduction of nickel chloride and were used as Comparative Example samples. The number rates of nickel powder having a particle size of 2 μm or more which existed in nickel powder of these samples (Nos. 1 and 2) were examined using the microscope. As a result, the number rate in Sample No. 1 was 1405 per million and the number rate in Sample No. 2 was 736 per million.

Next, the nickel powders of each Comparative Example as described above were dispersed in water, respectively, and were prepared in the slurry form at a slurry concentration (percentage by weight of nickel powder in slurry) of 10% by weight. These slurries were fed into a three-liquid separating type of hydrocyclone (trade name: TR-5 type super clone; produced by Murata Industry Co., Ltd.) at a feed pressure of 6 kg/cm² and were classified, and nickel powders were discharged from the top portion which was a nozzle for discharging fine particles and were obtained as the nickel powder of the Example, respectively. The number rates of nickel powder having a particle size of 2 μm or more which existed in nickel powder of these Examples were examined using the microscope. As a result, the number rate in Sample No. 1 was 33 per million and the number rate in Sample No. 2 was 42 per million. The results of the classification test are shown in Table 1.

TABLE 1

|  | Comparative Example (before classification) | Example (after classification) |
|---|---|---|
| Sample No. 1 | 1405/million | 33/million |
| Sample No. 2 | 736/million | 42/million |

As is apparent from in Table 1, in both samples Nos. 1 and 2, the number of nickel powder having a particle size of 2 μm or more in nickel powder classified by the hydrocyclone remarkably decreased and nickel powder according to the present invention could be obtained.

EXAMPLE 2

Surface Roughness Test of Electrode Layer

With respect to the nickel powder of the above sample No. 1, average particle sizes thereof before classification and after classification were examined. Then, these nickel powders were prepared in paste form and were applied on a substrate; a liquid component was evaporated by heating the substrate; and an electrode layer was therefore formed, and the surface roughness thereof was measured. Measurement conditions of the surface roughness, etc., are shown in the following.

① paste composition:

| α-terpineol | (42% by weight) |
|---|---|
| Ethyl cellulose | (3% by weight) |
| Nickel powder | (55% by weight) |

② substrate: Glass

③ paste coater:
  Screen printing machine

④ paste evaporation conditions:
  Nitrogen gas atmosphere at 400° C.

⑤ surface roughness measuring apparatus:
  Electron beam three-dimensional roughness analyzer (trade name: ERA-8000; produced by Elionics Co., Ltd.)

⑥ surface roughness measurement:
  The areas of portions surrounded by roughness curves measured on every scanning line and center lines thereof were divided by the lateral length, and then average roughness of the center line was subtracted therefrom. The measured value was defined as the surface roughness of 1 visual field. In addition, an average of 10 visual fields was defined as the surface roughness of the paste.

The measurement results of average particle size and surface roughness are shown in Table 2.

TABLE 2

|  | Comparative Example (before classification) | Example (after classification) |
|---|---|---|
| Average Particle Size (μm) | 0.62 | 0.41 |
| Surface Roughness (μm) | 0.249 | 0.103 |

As is apparent from Table 2, the surface roughness of the electrode layer in which nickel powder was prepared in paste form after classification was smoothed to half of the surface roughness thereof before classification, and it was confirmed to be very useful as a nickel powder for multilayer ceramic capacitors.

EXAMPLE 3

Classification Test of Nickel Powder

The nickel powder having an average particle size of 0.4 μm (BET diameter based on the specific surface conversion) produced by a vapor phase reduction of nickel chloride was dispersed in water and was prepared in the slurry form, then it was fed in the three-liquid separating type of hydrocyclone (trade name: TR-5 type super clone; produced by the Murata Industry Co., Ltd.), and the classification efficiency due to differences between slurry concentrations (percentage by weight of nickel powder in slurry) was examined. Slurry concentration, feed rate and feed pressure of slurry to hydrocyclone, and feed rate of nickel powder are shown in Table 3.

TABLE 3

|  | Slurry Concentration (Ni Powder: wt %) | Slurry Feed Rate (cc/min) | Slurry Feed Pressure (kg/cm$^2$) | Ni Powder Feed Rate (g/min) |
|---|---|---|---|---|
| Test No. 1 | 22.4 | 3775 | 6 | 846 |
| Test No. 2 | 14.7 | 3686 | 6 | 542 |
| Test No. 3 | 13.6 | 4083 | 6 | 556 |
| Test No. 4 | 11.0 | 3513 | 6 | 385 |
| Test No. 5 | 7.1 | 3471 | 6 | 247 |
| Test No. 6 | 5.3 | 3438 | 6 | 182 |
| Test No. 7 | 4.4 | 3286 | 6 | 143 |

The discharge amounts of the nickel powder in the slurries discharged from the top, middle, and bottom portions of hydrocyclone are shown in Table 4.

TABLE 4

|  | Top Portion (g/min (%)) | Middle Portion (g/min (%)) | Top and Middle Portions (g/min (%)) | Bottom Portion (g/min (%)) |
|---|---|---|---|---|
| Test No. 1 | 50.8 (6) | 587 (69) | 637.8 (75) | 208 (25) |
| Test No. 2 | 17.7 (3) | 365 (67) | 382.7 (70) | 159 (30) |
| Test No. 3 | 23.1 (4) | 351 (63) | 374.1 (67) | 182 (33) |
| Test No. 4 | 7.7 (2) | 213 (55) | 220.7 (57) | 164 (43) |
| Test No. 5 | 46.4 (19) | 164 (66) | 210.4 (85) | 36.1 (15) |
| Test No. 6 | 27.6 (15) | 114 (63) | 141.6 (78) | 40.0 (22) |
| Test No. 7 | 6.9 (5) | 65.4 (46) | 72.3 (51) | 70.9 (49) |

A relationship between slurry concentration and discharge rate of nickel powder of "the top portion and the middle portion" is shown in FIG. 1. As shown in FIG. 1, it was found that as the concentration of slurry fed to the hydrocyclone increases, the discharge amount of the nickel powder from the top and bottom portions increases; however, the discharge amount of nickel powder drops once when the concentration is more than about 7% by weight, and the discharge amount gradually increases again when it is more than about 10% by weight.

Furthermore, the existence of nickel powders having a particle size above 1 μm was examined by observing each sample using a microscope, and the quality thereof was evaluated. The evaluated results are shown in Table 5. In addition, with respect to nickel powders discharged from the top and middle portions, the contents (number rate) of nickel powder having particle sizes of 1 μm or more and 2 μm or more are examined, respectively. The results are shown in Table 6.

As is apparent from Tables 5 and 6, nickel powders which satisfy the qualities could be obtained from the top and middle portions at slurry concentrations of Tests Nos. 2 to 5.

TABLE 5

|  | Top Portion | Middle Portion | Bottom Portion |
|---|---|---|---|
| Test No. 1 | Δ | × | × |
| Test No. 2 | ○ | Δ | × |
| Test No. 3 | ○ | Δ | × |
| Test No. 4 | ○ | Δ | × |
| Test No. 5 | Δ | Δ | × |
| Test No. 6 | Δ | × | × |
| Test No. 7 | Δ | × | × |

○: There is no particle having a particle size of 1 μm or more.
Δ: There are a few particles having a particle size of 1 μm or more, but there is no problem in practical use.
×: There is many particles having a particle size of 1 μm or more.

TABLE 6

|  | Average Particle Size (μm) | | Particles Having A Particle Size of 1 μm or More (number rate per million) | | Particles Having A Particle Size of 2 μm or More (number rate per million) | |
|---|---|---|---|---|---|---|
|  | Top Portion | Middle Portion | Top Portion | Middle Portion | Top Portion | Middle Portion |
| Test No. 1 | 0.23 | 0.36 | 24 | 256 | 13 | 135 |
| Test No. 2 | 0.22 | 0.35 | 0 | 55 | 0 | 36 |
| Test No. 3 | 0.22 | 0.35 | 0 | 67 | 0 | 47 |
| Test No. 4 | 0.20 | 0.31 | 0 | 82 | 0 | 51 |
| Test No. 5 | 0.24 | 0.38 | 25 | 513 | 12 | 275 |
| Test No. 6 | 0.23 | 0.35 | 76 | 745 | 51 | 328 |
| Test No. 7 | 0.25 | 0.37 | 89 | 1570 | 58 | 628 |

The higher the concentration of the slurry fed to the hydrocyclone, the better the productivity, and the greater the weight of the nickel powder discharged from the top and middle portions, the higher the yield of the classified nickel powder. Therefore, the nickel powder of Test No. 2 is particularly desirable in the above Examples.

What is claimed is:

1. A nickel powder for multilayer ceramic capacitors, wherein an average particle size thereof is 0.1 to 1.0 μm, and the number rate of nickel powder having a particle size of 2 μm or more is not more than 700 per million.

2. A nickel powder for multilayer ceramic capacitors as recited in claim 1, wherein said number rate is not more than 50 per million.

3. A nickel powder for multilayer ceramic capacitors as recited in claim 1 or 2, wherein said nickel powder is prepared by a vapor phase reduction.

4. A nickel powder for multilayer ceramic capacitors as recited in claim 3, wherein said vapor phase reduction is conducted by a method in which nickel chloride solid is used as a starting material and vaporized by heating, and vaporized nickel chloride gas is reacted with hydrogen gas.

5. A nickel powder for multilayer ceramic capacitors as recited in claim 3, wherein said vapor phase reduction is conducted by a method in which nickel metal is used as a starting material and is chlorinated by contacting chlorine gas, and produced nickel chloride gas is reacted with hydrogen gas.

6. A nickel powder for multilayer ceramic capacitors as recited in claim 1 or 2, wherein said nickel powder is classified by a hydrocyclone and said hydrocyclone classifies powder in a powder-liquid mixture into at least coarse particles and fine particles.

7. A nickel powder for multilayer ceramic capacitors as recited in claim 6, wherein said nickel powder is obtained by feeding the slurry, in which nickel powder having an average particle size of 0.1 to 1.0 μm is contained in the amount of 5 to 25% by weight, into said hydrocyclone.

8. A nickel powder for multilayer ceramic capacitors as recited in claim 6, wherein said hydrocyclone comprises a nozzle for discharging fine particles and a nozzle for discharging coarse particles, and 5 to 80% of said nickel powder in the slurry is discharged from said nozzle for discharging fine particles and the remainder is discharged from said nozzle for discharging coarse particles in said hydrocyclone.

9. A nickel powder for multilayer ceramic capacitors as recited in claim 6, wherein said hydrocyclone comprises a nozzle for discharging super fine particles, a nozzle for discharging fine particles, and a nozzle for discharging coarse particles, and 5 to 80% of said nickel powder in the slurry is discharged from said nozzle for discharging super fine particles and/or said nozzle for discharging fine particles and the remainder is discharged from said nozzle for discharging coarse particles in said hydrocyclone.

10. A nickel powder for multilayer ceramic capacitors as recited in claim 9, wherein the amount of nickel powder from said nozzle for discharging fine particles is 20 to 75% by weight.

* * * * *

UNITED STATES PATENT AND TRADEMARK OFFICE
CERTIFICATE OF CORRECTION

PATENT NO.    : 6,454,830 B1
DATED         : September 24, 2002
INVENTOR(S)   : Takayuki Ito et al.

It is certified that error appears in the above-identified patent and that said Letters Patent is hereby corrected as shown below:

<u>Title page,</u>
Item [73], change "Assignees:" to -- Assignee: --; delete "; Toho Titanium, Chigasaki" (second occurrence).

Signed and Sealed this

Seventh Day of January, 2003

JAMES E. ROGAN
*Director of the United States Patent and Trademark Office*